Patented July 27, 1954

2,684,980

UNITED STATES PATENT OFFICE 2,684,980

USE OF NAPHTHALENE DISULFONIC ACID AS A CATALYST IN THE MANUFACTURE OF ISOPROPENYL ACETATE

Frank Clifford Mawer, Blackley, England, assignor to Imperial Chemical Industries Limited, a corporation of Great Britain No Drawing. Application May 26, 1952, Serial No. 290,080

Claims priority, application Great Britain May 29, 1951

8 Claims. (Cl. 260—488)

This invention concerns improvements in or relating to the manufacture of isopropenyl acetate.

It is known to obtain isopropenyl acetate by condensation of keten with acetone in the presence of acidic catalysts and their acetyl derivatives, for example in the presence of sulphuric acid, p-toluene sulphonic acid and p-nitrobenzenesulphonic acid.

Our invention is directed towards the provision of improved catalysts particularly adapted to the manufacture of isopropenyl acetate from keten and acetone, particularly when the keten has been obtained by pyrolysis of acetone and is consequently present in a mixture of gases at atmospheric pressure. Our catalysts are superior to the known catalysts giving higher yields than do the known catalysts.

According to the invention we provide a process for the manufacture of isopropenyl acetate by reacting keten with acetone characterised in that there is used as catalyst a naphthalene-disulphonic acid or a reaction product thereof with acetic anhydride or with keten.

As suitable naphthalene disulphonic acids there are for example naphthalene-1:5-disulphonic acid, naphthalene-2:6-disulphonic acid and naphthalene-2:7-disulphonic acid.

The reaction products of these naphthalenedisulphonic acids which may also be used are of uncertain constitution but it is believed that they are mixed anhydrides. It is believed also, although this hypothesis is advanced only by way of explanation, that when the naphthalene-disulphonic acid is used as such it is first converted into the said reaction product by reaction with keten.

The invention is illustrated but not limited by the following examples.

Example 1

A gas obtained by pyrolysis of acetone and containing about 30 mols. per cent of keten and substantially free from acetone is bubbled at a rate of 1.5 gram mols. of keten per hour through a solution of 5 grams of naphthalene-1:5-disulphonic acid in 1200 grams of acetone in a reaction vessel in a bath maintained at 75° to 85° C. Acetone is condensed from the off-gases at −60° to −70° C. and returned to the reaction vessel. After 14 hours the contents of the reaction vessel are fractionally distilled and 1442 grams of isopropenyl acetate are obtained. This represents a yield of 92.7% calculated on the acetone consumed and of 90.0% calculated on the keten absorbed. The conversion of acetone is 75.2%.

Example 2

170 grams of naphthalene-1:5-disulphonic acid (containing 20% water) is boiled under reflux with 320 grams of acetic anhydride during 4 hours in a bath maintained at 140° C. The mixture is then distilled to 40° C. at a pressure of 10 mms. The residue is used as catalyst in the following process in which the details are those of Example 1. Keten is passed at a rate of 1.5 gram mols. per hour through a mixture of 5 grams of the catalyst and 1250 grams of acetone for 13.5 hours. Distillation of the reaction mixture affords 1552 grams of isopropenyl acetate which represents a yield of 93.6% calculated on the acetone consumed and of 91.3% calculated on the keten absorbed. The conversion of acetone is 76.9%.

Example 3

Keten is passed at a rate of 1.5 gram mols. per hour through a mixture of 4 grams of naphthalene-2:6-disulphonic acid and 1300 grams of acetone for 6.5 hours as described in Example 1. Distillation of the reaction mixture affords 664 grams of isopropenyl acetate which represents a yield of 94.2% calculated on the acetone consumed and of 90.7% calculated on the keten absorbed. The conversion of acetone is 31.7%.

Under otherwise identical conditions but using 4 grams of sulphuric acid in the place of 4 grams of naphthalene-2:6-disulphonic acid, 316 grams of isopropenyl acetate are obtained which represent a yield of 80.4% calculated on the acetone consumed and of 74.4% calculated on the keten absorbed. The conversion of acetone is 17.6%.

Under otherwise identical conditions, but using 4 grams of p-toluenesulphonic acid in the place of 4 grams of naphthalene-2:6-disulphonic acid, 155 grams of isopropenyl acetate are obtained which represent a yield of 56.7% calculated on the acetone consumed and of 48.1% calculated on the keten absorbed. The conversion of acetone is 12.3%.

Example 4

180 grams of naphthalene-2:6-disulphonic acid (water content 20%) and 350 grams of acetic anhydride are boiled together under reflux during 4 hours in a bath maintained at 140° C. The mixture is then distilled to 40° C. at 10 mms. pressure and the residue is used as catalyst in the following process in which the details of operation are those of Example 1. Keten is passed at a rate of 1.5 gram mols. per hour through a mixture of 5 grams of the catalyst and 1300 grams of acetone for 6.5 hours. By distillation of the reaction product, 589 grams of isopropenyl acetate are obtained which represents a yield of 97.1% calculated on the acetone consumed and of 95.2% calculated on the keten absorbed. The conversion of acetone is 27.2%.

*Example 5*

Keten is passed at a rate of 1.5 gram mols. per hour through a mixture of 4 grams of naphthalene-2:7-disulphonic acid and 1300 grams of acetone for 5.5 hours as described in Example 1. Distillation of the reaction product affords 565 grams of isopropenyl acetate which represents a yield of 94.9% calculated on the acetone consumed and of 92.8% calculated on the keten absorbed. The conversion of acetone is 26.4.

Under otherwise identical conditions but using 4 grams of m-nitrobenzenesulphonic acid in place of the 4 grams of naphthalene-2:7-disulphonic acid, 206 grams of isopropenyl acetate are obtained. This represents a yield of 65.2% calculated on the acetone consumed and of 57.2% on the keten absorbed. The conversion of acetone is 14.2%.

What I claim is:

1. In the production of isopropenyl acetate by reacting keten with acetone in the presence of a catalyst, the improvement which comprises utilizing, as the catalyst, a compound selected from the group consisting of naphthalene disulfonic acids and reaction products thereof with a member of the group consisting of acetic anhydride and keten.

2. The improved process of claim 1, wherein said catalyst is naphthalene-1:5-disulfonic acid.

3. The improved process of claim 1, wherein said catalyst is naphthalene-2:6-disulfonic acid.

4. The improved process of claim 1, wherein said catalyst is naphthalene-2:7-disulfonic acid.

5. A catalyst comprising the reaction product of a naphthalene disulfonic acid and a compound selected from the group consisting of acetic anhydride and keten.

6. A catalyst comprising the reaction product of a naphthalene-1:5-disulfonic acid and a compound selected from the group consisting of acetic anhydride and keten.

7. A catalyst comprising the reaction product of a naphthalene-2:6-disulfonic acid and a compound selected from the group consisting of acetic anhydride and keten.

8. A catalyst comprising the reaction product of a naphthalene-2:7-disulfonic acid and a compound selected from the group consisting of acetic anhydride and keten.

References Cited in the file of this patent

UNITED STATES PATENTS

| Number | Name | Date |
| --- | --- | --- |
| 2,481,669 | Hull | Sept. 13, 1949 |
| 2,511,423 | Young | June 13, 1950 |